US005848783A

United States Patent [19]

Weissenborn

[11] Patent Number: 5,848,783

[45] Date of Patent: Dec. 15, 1998

[54] APPARATUS FOR HOLDING A SNOWBOARD DURING REPAIR AND MAINTENANCE

[76] Inventor: Richard K. Weissenborn, c/o Innovation Inc. 3017-6th Street, S.W. Calgary, Alberta, Canada, T2S 2M1

[21] Appl. No.: 742,475

[22] Filed: Nov. 1, 1996

Related U.S. Application Data

[60] Provisional application No. 60/006,266 Nov. 7, 1995.

[51] Int. Cl.[6] .............. B23Q 3/02

[52] U.S. Cl. .............. 269/97; 269/296; 269/906; 269/236

[58] Field of Search .............. 269/296, 43, 44, 269/236, 906, 97, 98

[56] References Cited

U.S. PATENT DOCUMENTS

| | | | |
|---|---|---|---|
| 106,080 | 8/1870 | Saurman | 269/254 CS |
| 172,734 | 1/1876 | Hauck | 269/254 CS |
| 233,672 | 10/1880 | Haley | 269/254 CS |
| 344,713 | 6/1886 | Blythe | 269/236 |
| 3,719,008 | 3/1973 | Mayers . | |
| 3,826,482 | 7/1974 | Tourangeau . | |
| 3,861,664 | 1/1975 | Durkee . | |
| 3,921,967 | 11/1975 | Campbell . | |
| 3,963,234 | 6/1976 | Bejtlich . | |
| 3,977,663 | 8/1976 | Kohler et al. . | |
| 4,018,430 | 4/1977 | Ursich . | |
| 4,050,685 | 9/1977 | Cox . | |
| 4,066,250 | 1/1978 | Campbell . | |
| 4,081,180 | 3/1978 | Munn . | |
| 4,140,307 | 2/1979 | Dalmau et al. | 269/97 |
| 4,175,736 | 11/1979 | Dietlein . | |
| 4,241,906 | 12/1980 | Cole . | |
| 4,262,890 | 4/1981 | Sisko et al. . | |
| 4,341,375 | 7/1982 | Romanin . | |
| 4,743,003 | 5/1988 | Dietlein . | |
| 5,150,887 | 9/1992 | Weissenborn et al. . | |
| 5,228,667 | 7/1993 | Bridegum | 269/97 |
| 5,236,183 | 8/1993 | Curtis . | |
| 5,329,882 | 7/1994 | Hunt | 269/909 |

FOREIGN PATENT DOCUMENTS

| | | |
|---|---|---|
| 999314 | 11/1976 | Canada . |
| 1015378 | 8/1977 | Canada . |
| 1017762 | 9/1977 | Canada . |
| 1030989 | 5/1978 | Canada . |
| 1088114 | 10/1980 | Canada . |

*Primary Examiner*—James G. Smith
*Assistant Examiner*—Lee Wilson
*Attorney, Agent, or Firm*—Leonard Bloom

[57] ABSTRACT

Apparatus for holding a snowboard in a stable horizontal position during snowboard base preparation and maintenance, which apparatus also employs mechanism permitting the board to be swung around into a vertical orientation and held there in a stable manner for board edge maintenance procedures. An improved three-point support arrangement which provides substantial support of the snowboard for base preparation and wherein an intermediate support can be quickly and readily swung out of the way to allow the board to be moved into a vertical orientation for edge maintenance. The apparatus may be provided with clamps for securely engaging the ends of the snowboard and holding it firmly in position during repair and maintenance procedures. The apparatus is adaptable for use with a very wide variety of snowboards having different lengths, widths, board tip angles and board thicknesses.

32 Claims, 13 Drawing Sheets

FIG. 8
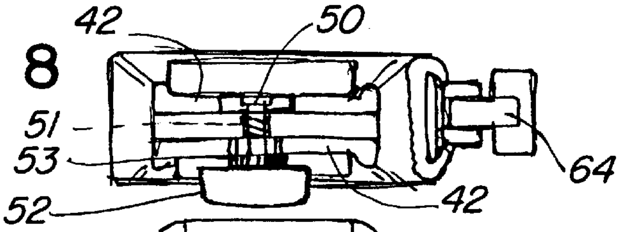
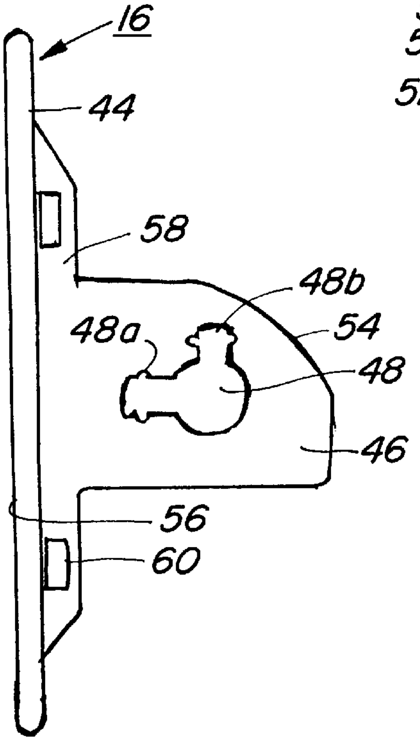
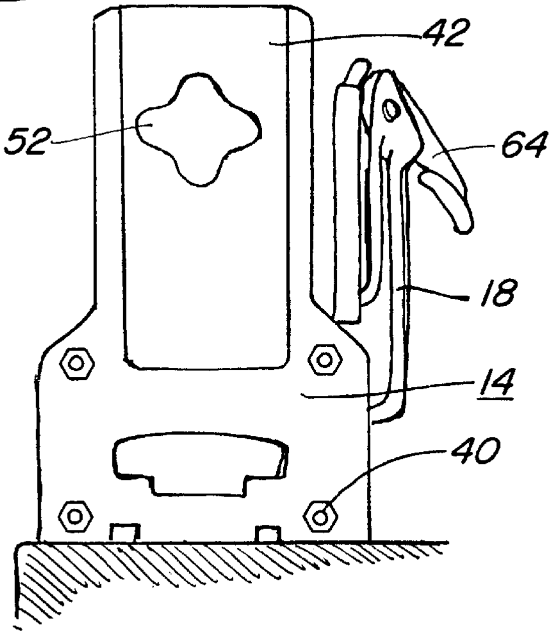
FIG. 9
FIG. 7
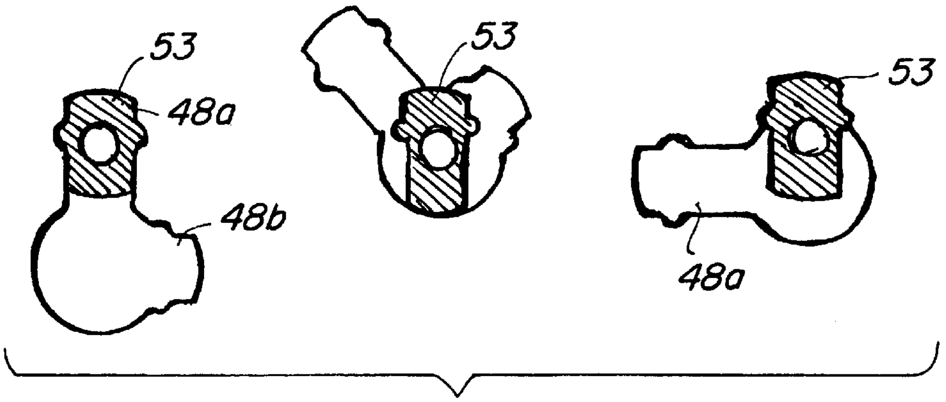
FIG. 8A

APPARATUS FOR HOLDING A SNOWBOARD DURING REPAIR AND MAINTENANCE

This application claims the benefit of U.S. Provisional application No. 60/006,266, filed Nov. 07, 1995.

BACKGROUND OF THE INVENTION

This invention relates to apparatus for holding a snowboard or the like in such a manner as to facilitate waxing and maintenance operations thereon.

The prior art has provided various forms of devices for holding skis on or above stationary support such as a workbench to allow for preparation of the ski base and edges. One such ski holding device is disclosed in U.S. Pat. No. 5,150,887 to Weissenbom et al issued Sep. 29, 1992.

Snowboards have become increasingly popular in recent years and, as is the case with skis, snowboards require frequent maintenance to ensure optimal performance and prolonged useful life. Maintenance procedures include cleaning, repair and waxing of the snowboard base materials as well as maintenance of the snowboard edges to remove roughness and the like. These procedures must be repeated throughout the life of the snowboard and hence it is desirable to provide apparatus for securing the snowboard in positions such that the maintenance work can readily be accomplished with, at the same time, a minimum of time and effort being required to mount and dismount the snowboard to and from the snowboard holder.

SUMMARY OF THE INVENTION

It is a general object of the invention to provide an improved apparatus for holding snowboards and the like at a work station during repair and maintenance operations.

A further object is to provide apparatus for holding a snowboard in a stable horizontal position during snowboard base preparation and maintenance which apparatus also employs means permitting the board to be swung around into a vertical orientation and held there in a stable manner for board edge maintenance procedures.

It is a further object of the invention to provide an improved three-point support arrangement which provides substantial support of the snowboard for base preparation and wherein an intermediate support can be quickly and readily swung out of the way to allow the board to be moved into a vertical orientation for edge maintenance.

It is a still further object of the invention to provide a snowboard holding apparatus of the type noted above which is provided with clamps for securely engaging the ends of the snowboard and holding it firmly in position during repair and maintenance procedures.

It is a further general object to provide apparatus for use in snowboard maintenance and repair procedures which is adaptable for use with a very wide variety of snowboards having different lengths, widths, board tip angles and board thicknesses.

Accordingly, the invention in one aspect provides a portable holder for use in spaced relation with a similar holder as a snowboard support for maintenance operations at a work station, each said holder being adapted to support one of the opposing end portions of the snowboard. The portable holder comprises a base section adapted to be fixed to the work station in a generally upright position and a snowboard support head mounted to said base section for movement between a position where said support head is generally horizontal for snowboard base maintenance to one where said support head is generally vertical. The base section further has a side clamp thereon for releasably clamping a snowboard in a generally vertical orientation for snowboard edge maintenance when the support head is in the generally vertical position, whereby said holder can be readily converted between snowboard base maintenance and snowboard edge maintenance operations.

The support head is preferably mounted to the base section for generally pivotal movement between said horizontal and vertical positions and means are provided for locking the support head in either said position.

The said side clamp preferably comprises a clamp leaf and a cam associated therewith to bias said clamp leaf against a snowboard located in said side clamp to fix the snowboard relative to said base section for edge maintenance thereof.

The snowboard support head typically has a resilient surface thereon to frictionally engage the snowboard when resting thereon in the generally horizontal snowboard base maintenance position.

In another embodiment of the invention each said holder includes an end clamp for gripping an end of the snowboard to secure same to said support head. Preferably said end clamp includes opposed jaws for gripping said snowboard end therebetween and a clamp jaw actuator handle for opening and closing the jaws. As a further feature said actuator handle has a pressure spring associated therewith to permit said jaws to resiliently engage a variety of snowboard end thicknesses.

The end clamp preferably includes a wing assembly detachably secured to said support head to hold the end clamp outboard of the base section, said wing assembly being flexible to accommodate a variety of snowboard tip angles.

Another aspect of the invention provides a center support for use with the portable holder described above and adapted to be attached to the work station intermediate a pair of said holders to provide additional support to the center of the snowboard during base maintenance. The center support has a board contacting center support head and means for adjusting the height of same relative to the work station.

The center support preferably includes a center support base to which said board contacting center support head is mounted. The center support base has upper and lower sections with the upper section being releasable from the lower section and pivotable and rotatable relative thereto outwardly and downwardly to provide clearance, when in use, to permit the snowboard to be moved into the vertical orientation and secured in the side clamps of the board holders for edge maintenance purposes.

In a preferred embodiment said center support head is mounted for movement inwardly or outwardly of the support base to provide the adjustment in height. A spring acts to bias the center support head outwardly, and means are provided to secure the center support head in the desired adjusted condition.

Further features of the invention will be apparent from the detailed description of preferred embodiments which follows hereinafter, reference being had to the appended drawings.

BRIEF DESCRIPTION OF VIEWS OF DRAWINGS

FIG. 7 is a front elevation view of the base portion of the holder;

FIG. 8 is a top plan view of the holder base;

FIG. 8A is a further view showing the locking block in the base portion;

FIG. 9 is an elevation view of the board supporting head portion of the holder;

DETAILED DESCRIPTION OF THE PREFERRED EMBODIMENTS

Referring firstly to FIGS. 1–10, which illustrate an embodiment of the invention in its simplest form, there is shown a pair of portable holders 10 for use in spaced relation with one another as a snowboard support for maintenance operations being carried out at a work station. Each of these holders is adapted to support one of the opposing end portions of the snowboard 12.

Figure 1:
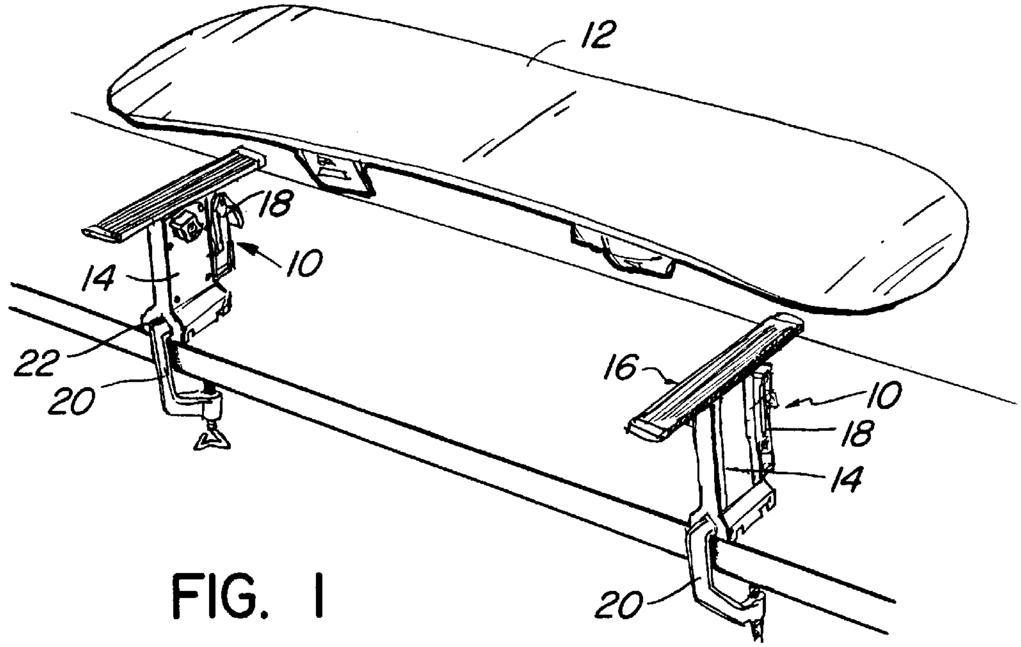
FIG. 1 is a perspective view illustrating a pair of snowboard holders clamped to a table or work bench in spaced relation with the snowboard shown in a raised position above these holders.
Figure 2:
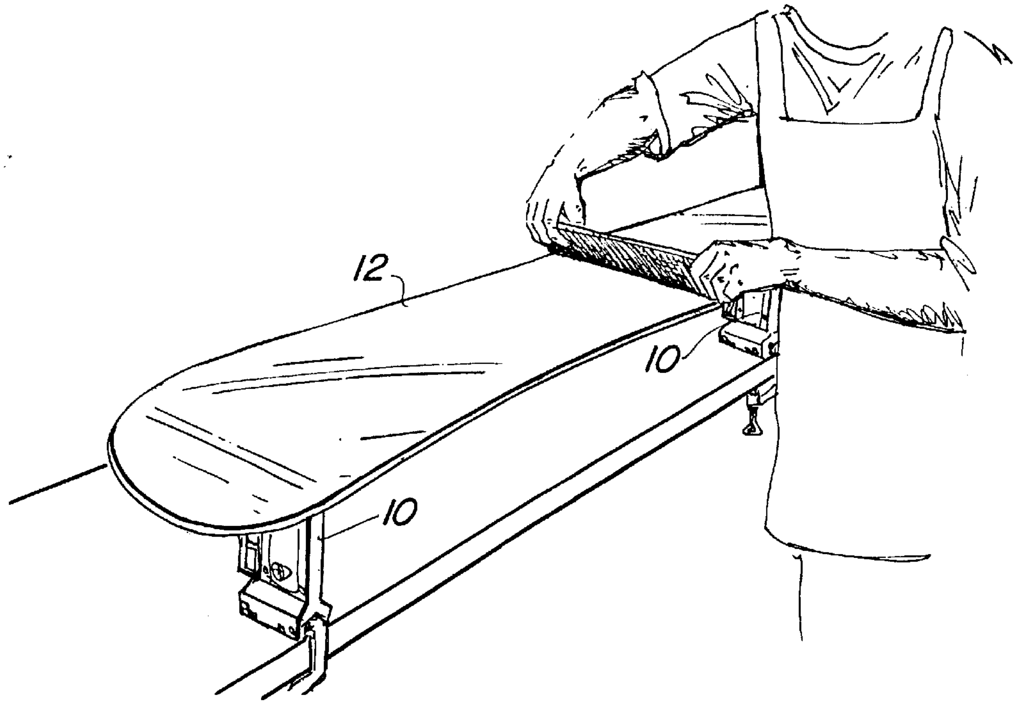
FIG. 2 is a further perspective view showing the snowboard positioned on the two holders for snowboard base preparation/maintenance.
Figure 3:
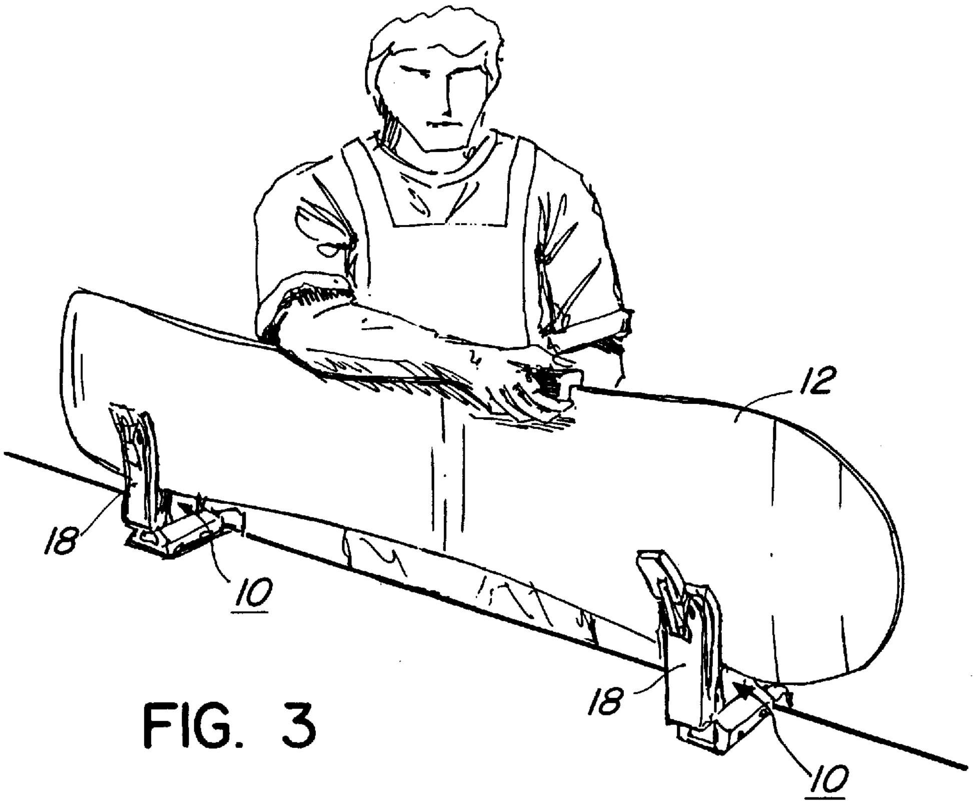
FIG. 3 is a further perspective view showing the same two holders clamped to the work bench but with the snowboard having been moved into a vertical orientation and held by the clamps of the holders for snowboard edge maintenance.
Figure 6:
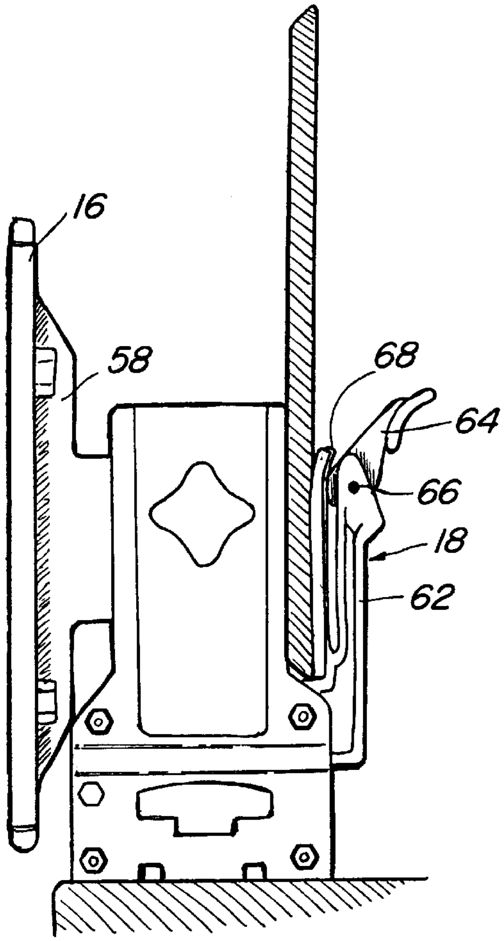
FIG. 6 is a view similar to that of FIG. 5 except that the head portion has been rotated into a vertical orientation and the snowboard placed into position in the side clamp of the holder and secured in a vertical orientation.

Essentially, each holder comprises a base section 14 adapted to be fixed to the work station in a generally upright position. A snowboard support head 16 is mounted to the base section 14 for movement between a position where the support head 16 is generally horizontal for snowboard base maintenance (as seen in FIGS. 1 and 2) to a position wherein the support head 16 is generally vertically oriented (as in FIGS. 3 and 6). It will also be seen that the base sections 14 each further include a side clamp 18 thereon for releasably clamping the snowboard in the generally vertical orientation for snowboard edge maintenance (as seen in FIGS. 3 and 6). By virtue of this movably mounted support head 16 and by virtue of the side clamp 18 arrangement, the holders 10 can be readily converted between snowboard base maintenance and snowboard edge maintenance operations. Further details of the holder configuration and construction will be described hereinafter.

As clearly seen in FIGS. 1 and 2, the holders 10 are mounted to the work bench by means of C-clamps 20. The base sections of the holders are provided with convenient apertures 22 extending above and parallel to the base bottoms thereby to receive the upper legs of the C-clamps 20 to permit convenient clamping to the work bench.

Figure 4:
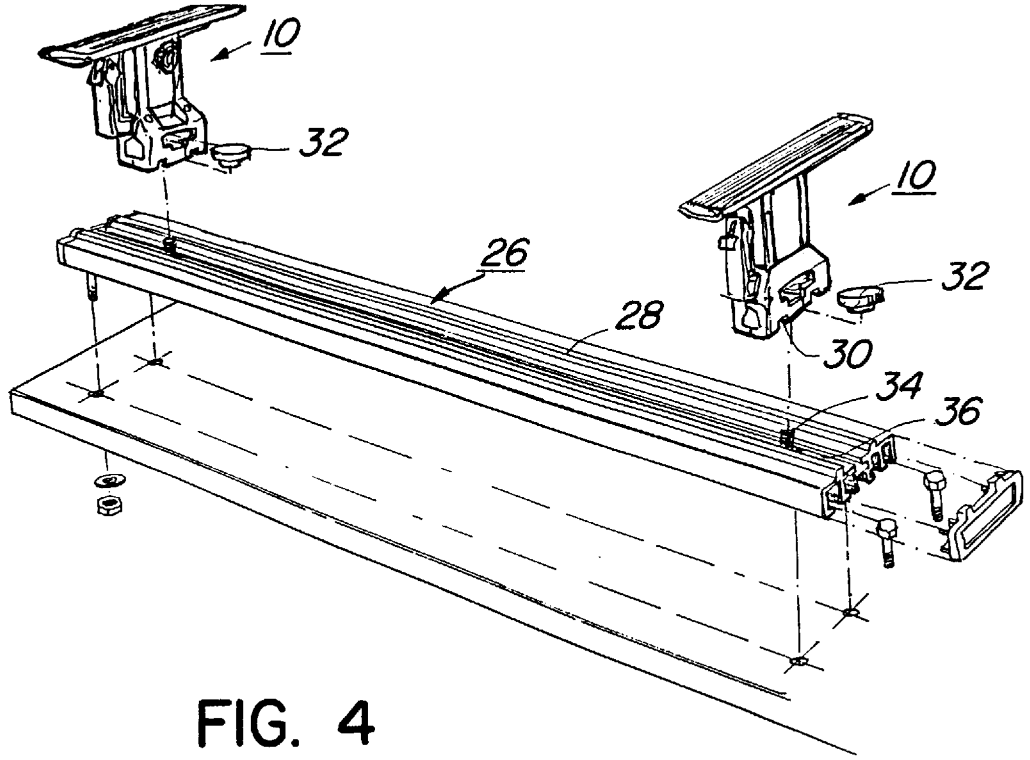
FIG. 4 is a further perspective view showing the two holders in positions ready to be secured to an optional support rail, which support rail in turn is adapted to be fixed to a work bench or table.

As seen in FIG. 4, the holders are both mounted to an (optional) elongated support rail 26 having a multiplicity of ribs 28 on its upper surface which interface with spaced grooves 30 provided in the bottom of the holder base sections 14 thereby preventing unwanted rotation of the holders 10 about their vertical axes. Mounting knobs 32 sized to fit into the bottoms of the holder base sections 14 co-operate with headed adjustment screws 34 located within a center dove-tail groove 36 of the support rail 26 thereby to enable the holders 10 to be slid toward and away from one another and then tightened at the desired distance from each other thereby to accommodate the length of the snowboard to be worked on. The support rail 26 is, in turn, affixed to the work bench by means of suitable fasteners in a manner well known in the art.

Reference will now be had to FIGS. 5–9 which show the holder 10 in detail. The holder 10 itself is preferably made from a sturdy moulded plastics material preferably reinforced with glass fibres to provide the necessary strength and rigidity. The base section is preferably moulded as two almost identical halves about a plane of symmetry with the two halves being held together by threaded fasteners 40. These two halves of the base section, when assembled together, also interlock with and securely fix the side clamp assembly 18 to the base section 14.

The upper half of the base section 14 includes a spaced apart generally parallel pair of wide but relatively thin flanges 42. The previously mentioned support head includes a somewhat elongated head portion 44, to the central portion of which is affixed a support tongue 46. This support tongue is sized so as to fit between the two flanges 42 noted above of the base section. The lower corner of the support tongue is arcuately curved at 54. The support tongue has a large aperture 48 in it, which aperture has a pair of recesses 48*a*, 48*b* at right angles to one another and through which aperture 48 passes an adjustment bolt 50, which bolt passes through the two flanges 42 of the base section, through coil spring 51, through a locking block 53, and into adjustment knob 52 behind which is the spring-biased locking block 53. Locking block 53 is non-rotatably and slidably mounted for movement in frontal flange 42 and is shaped to complement the shape of the recesses 48*a*, 48*b*. Knob 52 can be tightened to move the locking block inwardly to lock the support head 16 in position or loosened to allow the block 53 to be pushed outwardly by the spring 55 to move it clear of the aperture in the tongue 46. Hence, by virtue of the two recesses 48*a*, 48*b* at right angles to one another with which locking block 53 can alternately engage, the support tongue 46 and support head 16 are provided with a pair of relatively stable locked positions, i.e. when the support head 16 is in the generally horizontal configuration shown in FIG. 5, the locking block 53 can enter into the first recess 48*a* when knob 52 is tightened (FIG. 8A). Conversely, after knob 52 is loosened to withdraw block 53 and the support head 16 is lifted upwardly, then the entire support head can be rotated around 90° and the support head then allowed to drop down vertically a short distance with knob 52 being tightened until block 53 enters into the second recess 48*b* (FIG. 8A) thus providing a locked second vertical position for the support head as shown in FIG. 6. This locked second (vertical) position is of importance in the second embodiment of FIGS. 11–25 as it enables two boards to be held in the vertical position at the same time for edge maintenance work.

The head portion 44 of the support head is provided with an elongated resilient rubber pad 56 to prevent damage to the snowboard upper surface during use and also to provide for good frictional engagement therewith. The upper surface of this pad 56 is preferably ribbed to increase the frictional holding forces. The head portion is also provided with reinforcing flanges 58 which are co-planar with and disposed in flanking relation to the support tongue 46. These flanges are each provided with a rectangular aperture 60 to permit mounting of a board end clamping assembly to be described hereinafter.

Figure 5:
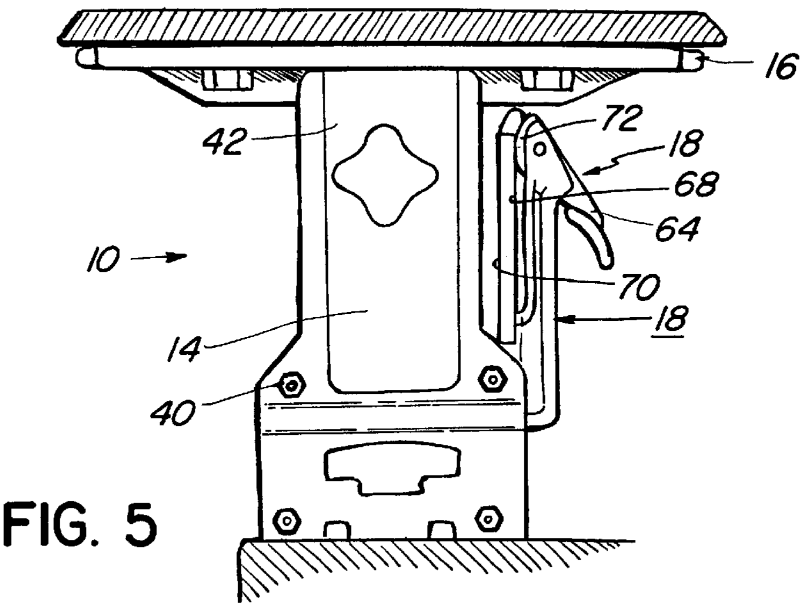
FIG. 5 is a front elevation view of a holder in accordance with the invention with the snowboard supporting head portion being shown in the horizontal position.

With reference to FIGS. 5 and 6 for example the side clamp 18 is fixed in a dove-tail-like recess between the two halves of the base section 14. With the exception of the pivoting lever cam, the side clamp is moulded as a one-piece formation. It includes a sturdy and rigid upright cam mounting arm 62, the upper end of which is bifurcated to receive the lever cam 64 which is pivoted to the upper end of the arm by a pivot pin 66. An elongated clamp leaf 68, which is integrally connected at its lower end with the base of the cam mounting arm 62, extends upwardly in spaced parallelism to the cam mounting arm 62, terminating slightly beyond the upper end of the latter. The clamp leaf 68 is provided with an elongated resilient rubber pad 70 to firmly frictionally grip the snowboard surface and at the same time preventing damage thereto. The lever cam 64 is provided with a cam section 72 which is shaped such that as the lever cam is rotated counterclockwise as seen in FIG. 5, the clamp leaf 68 is forced toward the side edge portions of the flanges 42 thereby securely engaging a snowboard which has been positioned between the base section flanges 42 and the clamp leaf 68. That portion of the clamp leaf 68 which makes contact with the cam section 72 may be provided with multiple serrations therein (not shown) to prevent unwanted release of the lever cam 64 during use.

Figure 10:
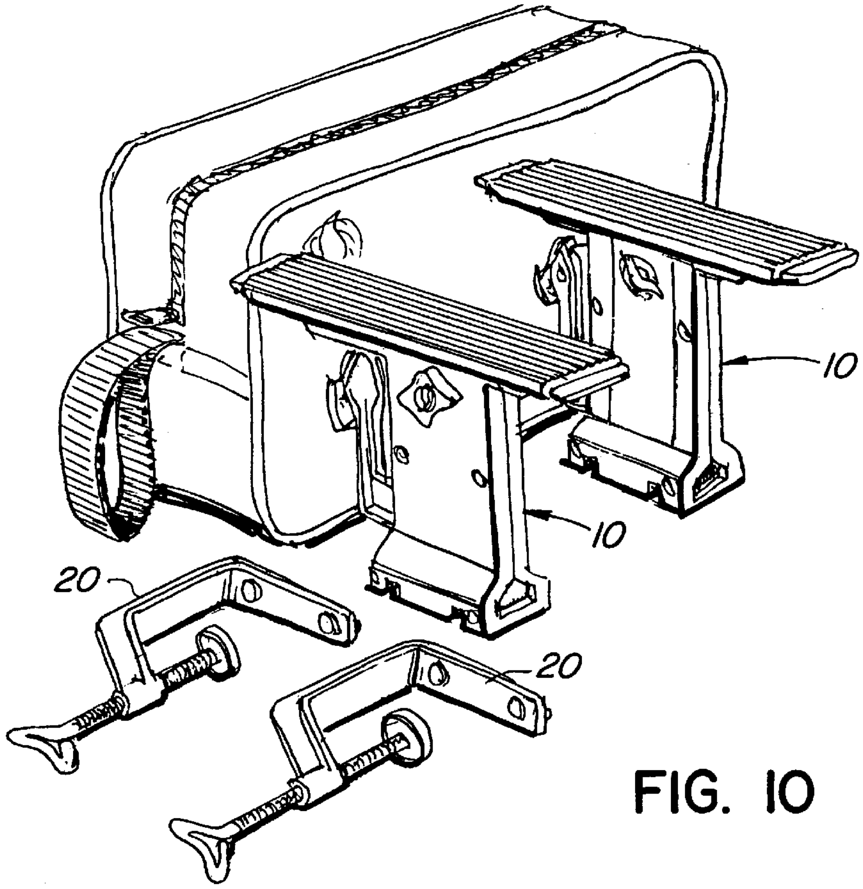
FIG. 10 is a perspective view of the portable kit of parts related to the embodiment of the invention shown in FIGS. 1–9.

The complete kit of parts required to provide the arrangement shown in FIG. 1 is illustrated in FIG. 10. The two holders 10 are shown along with the associated C-clamps 20. All of these parts may be easily fitted into a convenient carrying bag to provide ready portability. The kit can be assembled or fitted onto any convenient work bench or table top.

Figure 11:
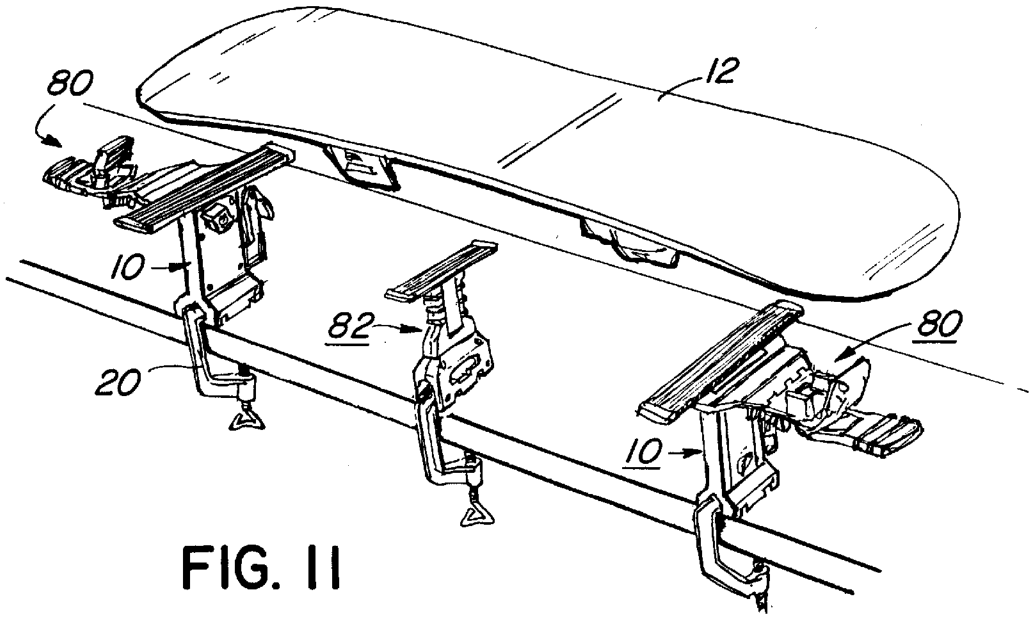
FIG. 11 is a further perspective view showing a spaced pair of holders as in FIG. 1 for supporting opposing end portions of the snowboard, each such holder having a board end clamp for securing the board in position, there also being provided a center support assembly, all of the above being shown as clamped to a table or work bench.

The snowboard holding system illustrated in FIGS. 11–24 includes a number of additional features over and above those described above in connection with the arrangement of FIGS. 1–10. FIG. 11 is a perspective view showing a spaced pair of holders 10 constructed as described above in connection with FIGS. 1–10. However, each such holder 10 is provided with a respective board end clamp assembly 80 for snugly securing the board in position on the two holders 10. In addition, there is also provided a center support 82 to provide increased stability under the board when working on the base. As shown in FIG. 11, the two holders 10 and the center support 82 are secured to the work bench by means of the C-clamps 20 illustrated. In place of the C-clamps, the support rail assembly 26 shown in FIG. 15 may be utilized. This support rail assembly makes use of the same adjustment knobs 32 and screws 34 as briefly described in connection with FIG. 4 whereby the two holders 10 and center support 82 may be adjusted back and forth along the support rail 26 and fixed in any desired positions relative to one another.

Figure 12:
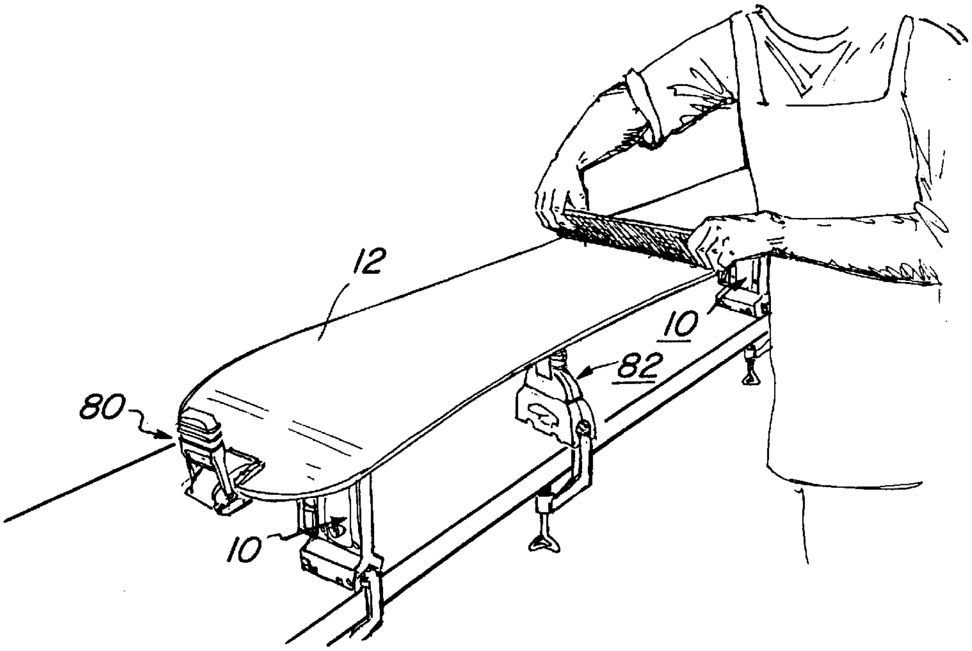
FIG. 12 is a further perspective view showing the arrangement of FIG. 11 when in use with the snowboard being clamped in a horizontal position for base preparation.

FIG. 12 shows the snowboard positioned on and supported by the two holders 10 and the center support 82. In addition the end clamp assemblies 80 have been moved into the holding or gripping positions whereby the snowboard is positively prevented from moving off the two holders 10 and center support 82.

Figure 13:
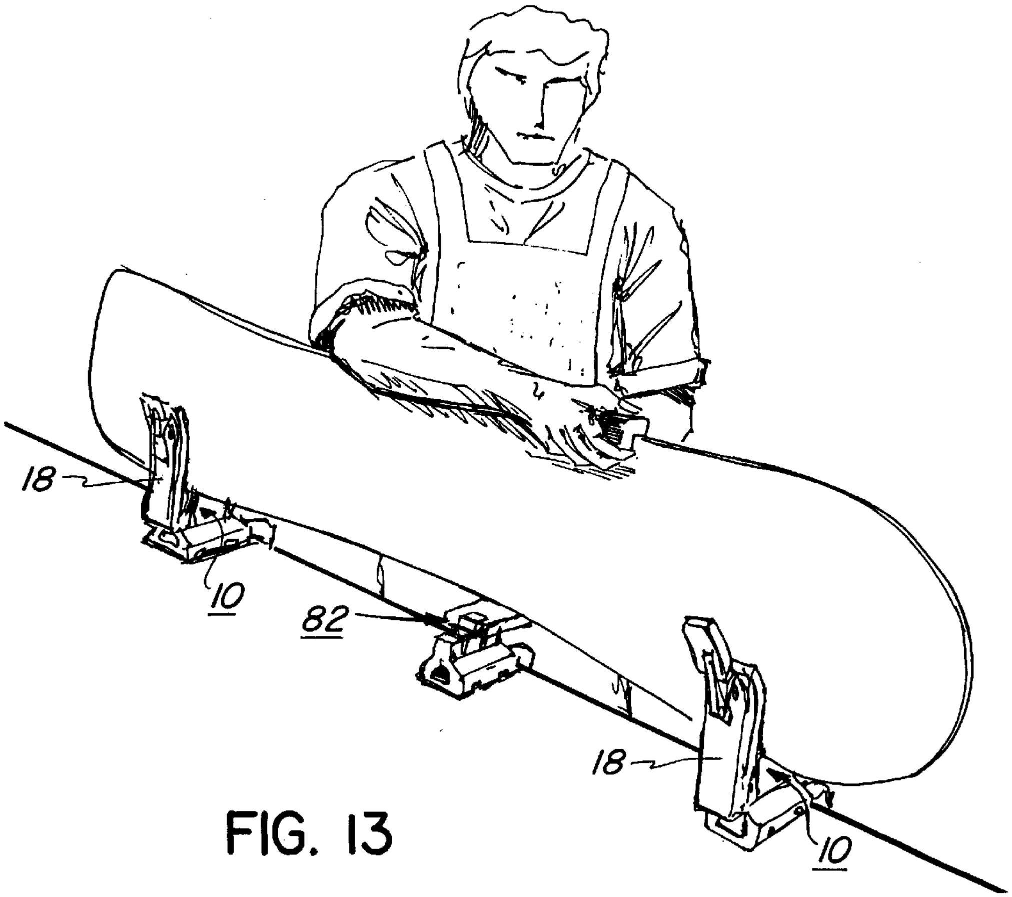
FIG. 13 is a further perspective view showing the board oriented in a vertical position and held by the side clamps and the center support having been pivoted around and swung downwardly out of the way.

In the configuration shown in FIG. 13 the snowboard has been rotated into the vertical position for edge repair or maintenance, the board being held in the side clamps 18 of the two holders 10 exactly as illustrated previously in connection with FIG. 3. The only difference here is that the center support 82 has been swung around and downwardly clear of the lower edge of the snowboard.

Figure 14:
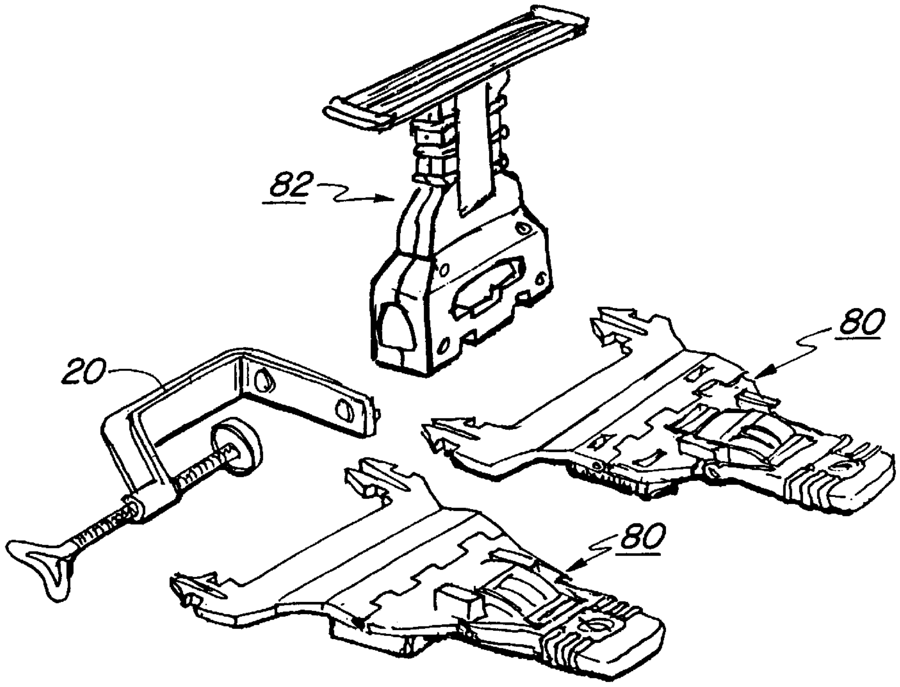
FIG. 14 illustrates the additional components over and above those in FIG. 1 needed to make up the holding system/assembly illustrated in FIG. 11.
Figure 15:
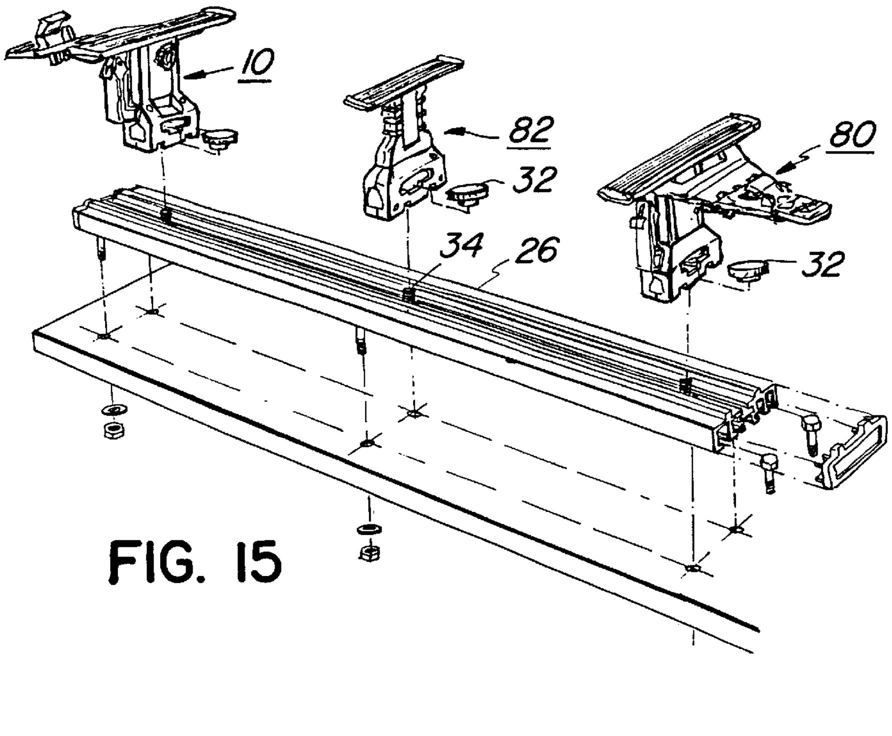
FIG. 15 is a further perspective showing the holding system of FIGS. 11–14 in positions ready to be mounted by way of an optional support rail on a table or workbench.

FIG. 14 is a perspective view depicting the additional components needed to make up the snowboard supporting and holding system shown in FIGS. 11 onward over and above those components needed to produce the system of FIGS. 1–10. In particular all that is needed is the center support 82, an additional C-clamp to hold it in place on the work bench, and two board end clamp assemblies 80, one for each of the previously described holders 10. This helps to illustrate the fact that a small repair shop may choose to start out with the simpler system illustrated in FIGS. 1–10 and then at a later point in time upgrade the system to the more sophisticated arrangement of FIGS. 11–25 simply by purchasing the additional components illustrated in FIG. 14.

Figure 16:
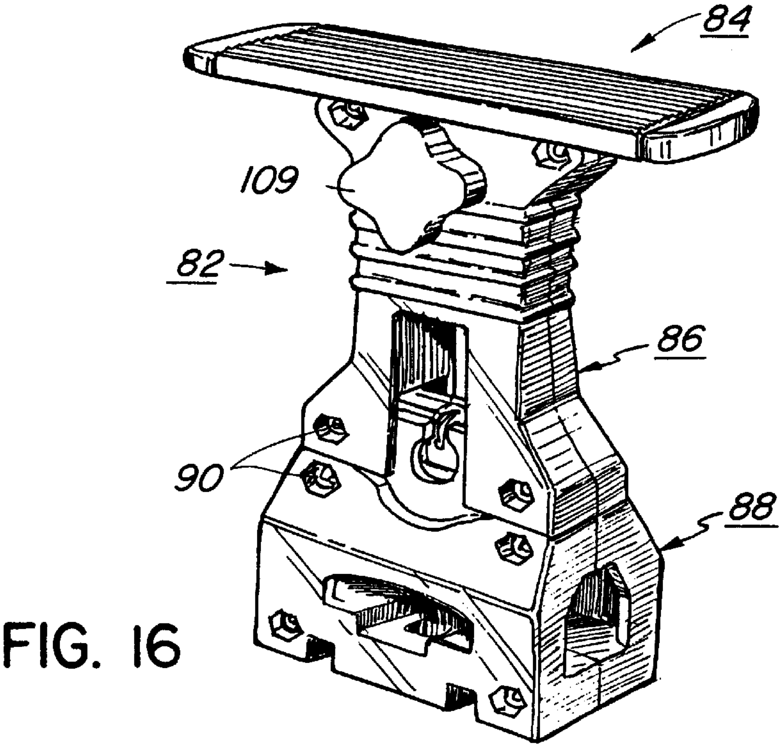
FIG. 16 is a perspective view of the center support assembly.

The center support 82 is clearly shown in its several configurations in FIGS. 16–21. With reference to FIG. 16, the center support includes a center support head 84 which contacts the snowboard surface during use and applies upward pressure to it, the center support head 84 being mounted in the base upper section 86 with the latter, in turn, being mounted to the lower base section 88. These components, as with the holders 10 previously described, are preferably made of a tough fibre-filled plastics material to provide the necessary strength and rigidity. Each of the upper and lower base sections 86, 88 are preferably made by moulding as two halves secured together by suitable fasteners 90 in a manner which need not be described in detail.

Figure 17:
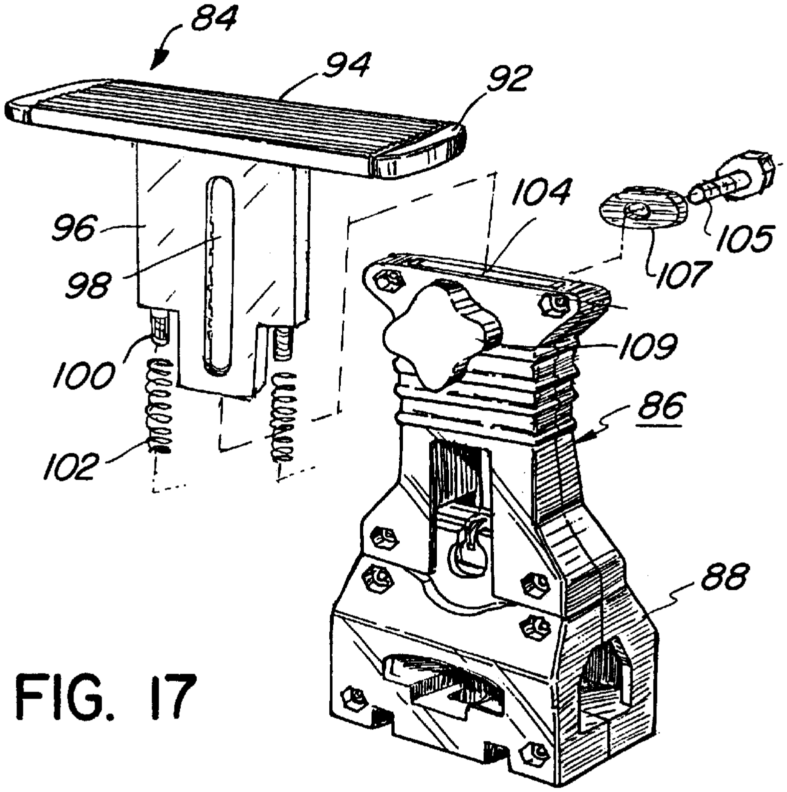
FIG. 17 is a partially exploded view of the center support assembly.

Referring to FIG. 17, the center support head 84 includes a somewhat elongated rectangular head element 92 which is covered by a rubber pad 94 thereby to engage the snowboard surface without damaging same while providing a reasonable frictional grip therebetween. A support tongue 96 is formed integrally with the head element and extends downwardly from the central portion thereof, such tongue 96 having opposed generally parallel walls and having an elongated center slot 98 extending longitudinally thereof. The lower comers of the support tongue are recessed and are provided with short posts 100 which serve to retain thereon coil compression springs 102.

The support tongue 96 extends downwardly into a slot-like recess 104 provided in the upper base section 86. The upper base section 86 is provided with spaced pockets (not shown) each receiving a respective one of the coil springs 102 noted above so that when the support tongue 96 is properly positioned within the recess 104, the springs 102 tend to urge the entire center support head 84 upwardly. A height adjustment bolt 105 also extends through the upper part of the upper base section 86, this bolt being associated with an adjustment block 107 which is located in an elliptical hole (not shown) so that it cannot rotate on the rear face of the upper base section such that the adjustment block 107 can make direct contact with the rear face of the support tongue 96 (as seen in FIG. 17), such rear face being provided with shallow serrations (not shown) such that when the adjustment bolt 105 is tightened, as by rotating an adjustment knob 109, the center support head 84 can be effectively secured in any desired position height-wise relative to the base sections 86, 88. Accordingly, once the snowboard has been positioned on the holders 10 which support the opposing end portions of the snowboard, the effective supporting height of the center support head 84 can readily and quickly be adjusted to provide the desired degree of stability to the central portion of the board.

Figure 18:
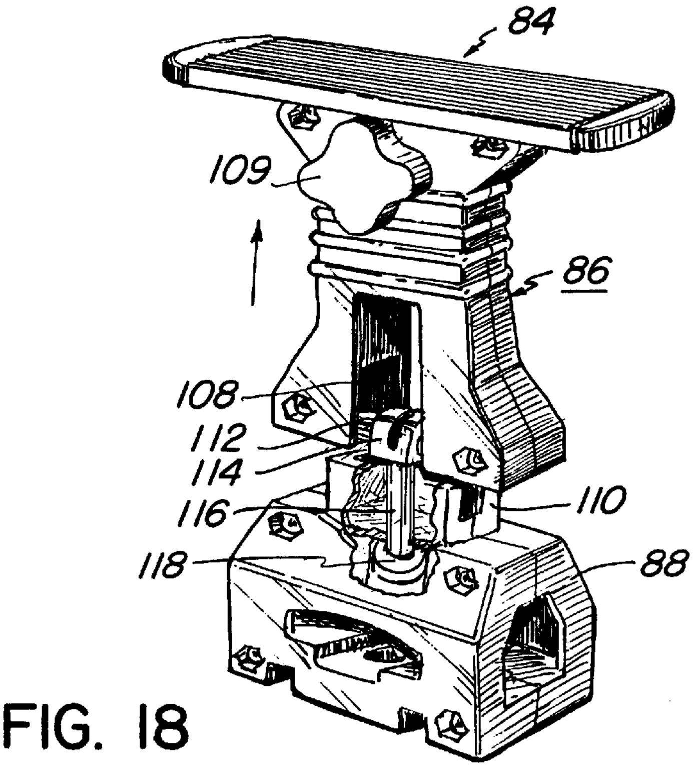
FIG. 18 is a further perspective of the center assembly with the upper section of the center support base having been pulled upwardly and released from the lower base section.

With reference to FIG. 18 it will be seen that the upper base section 86 has been lifted upwardly a predetermined distance relative to the lower base section 88. The lower part of the upper base section 86 is provided with a generally rectangular recess 108 which snugly receives therein an upstanding rectangular boss 110 formed on the upper or top surface of the lower base section 88. Hence, when the upper and lower base sections 86, 88 are in close communication with each other as shown in FIG. 16, the entire base acts as a single rigid unit and there is sufficient interference between the walls of the recess 108 and boss 110 that a small amount of force is required to pull them apart. It will also be noted that the upper base section 86 is provided with a flat-sided transverse pin 112 which extends lengthwise and within the above-noted recess 108 and is fixed for rotation with upper base section 86. This pin 112 is engaged with and passes through the enlarged eye 114 formed at the upper end of a vertical coupling pin 116 which is mounted in the lower base section 88. This coupling pin 116 is provided with a lower enlarged head 118 which limits the degree of upward movement of the coupling pin 116 relative to the lower base section 88. In other words, the head 118 of the coupling pin, which comes up into contact with the interior surface of the top wall of the lower base section 88, effectively limits the degree to which the upper base section 86 can be lifted, this upper limit being illustrated in FIG. 18 where it will be seen that the lower extremities of the upper base section 86 are just clear of and slightly above the upper extremities of the boss 110.

Figure 19:
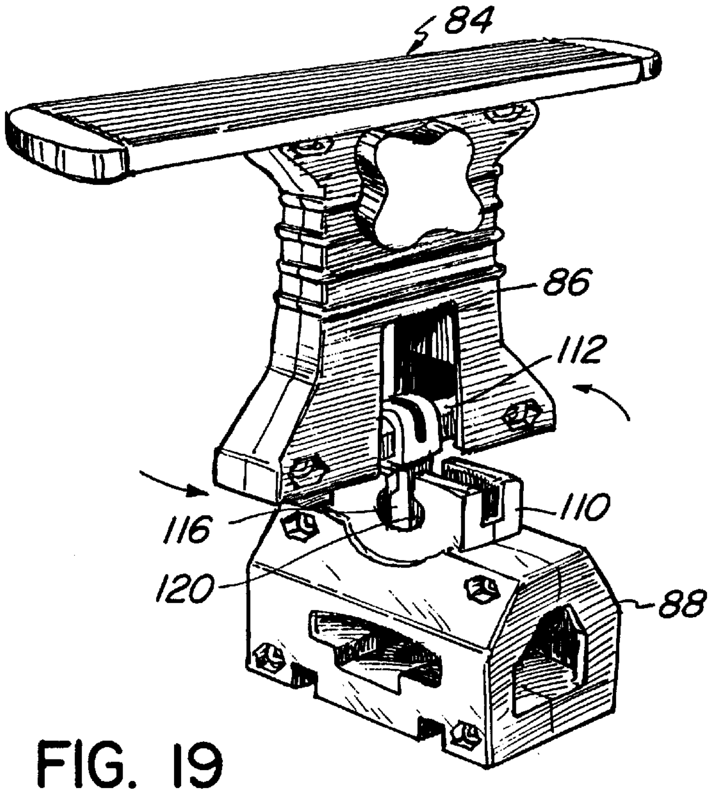
FIG. 19 is a further perspective view of the center support showing the upper section thereof having been rotated 90° about a vertical axis relative to the lower section.
Figure 20:
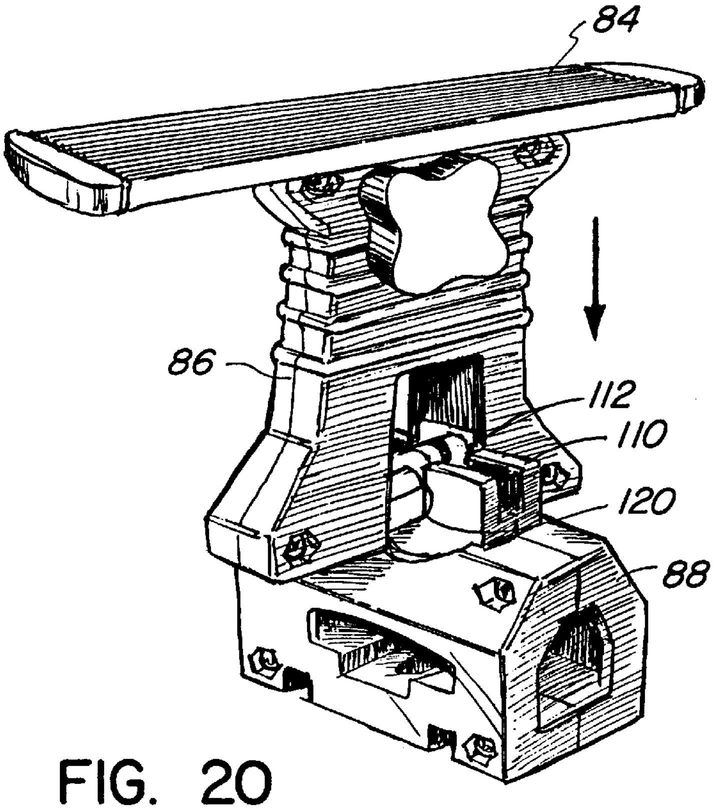
FIG. 20 is a further perspective of the center support showing the upper section of the support base having been lowered downwardly onto the lower section at right angles thereto.

With reference to FIG. 19, it can be seen that the entire upper base section 86, together with the central support head 84, have been rotated through a 90° angle about the axis of pin 116 relative to the lower base section 88. It will be further observed from FIG. 19 that the aforementioned boss 110 is essentially of a hollow configuration, firstly to accept the transverse pin 112 when the upper base section 86 has been fitted downwardly over the boss 110 as in FIG. 16, and secondly, to provide transversely oriented opposed openings 120 defining trunnions into which the transverse pin 112 may enter once the upper base section 86 has again been lowered downwardly onto the lower base section 88 (such upper and lower base sections being at 90° angles to one another about a vertical axis, all as illustrated in FIG. 20). The distance between the flats of the transverse pin 112 is only marginally less than the widths of the entrances to openings 120 to allow entry when the upper base section 86 is vertical, but preventing escape of the transverse pin 112 from openings 120 after the upper base section has been rotated 90° to the horizontal as shown in FIG. 21.

Figure 21:
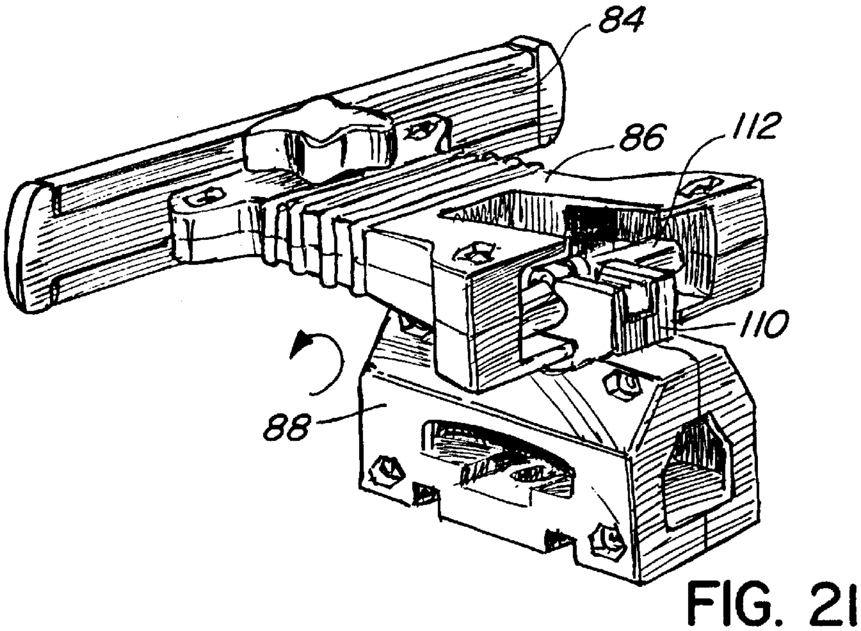
FIG. 21 is a further perspective of the center support showing the entire upper section thereof having been pivoted 90° about the horizontal axis to move the center support out of the way as illustrated in FIG. 13.

By virtue of the structure just described the entire upper base section 86 together with the central support head 84 can be rotated around the axis defined by the transverse pin 112 to the orientation shown in FIG. 21 such that the entire upper base section 86 and center support head 84 have now been pivoted around, downwardly, and well clear of the snowboard, hence allowing the latter to be moved into the vertical position and secured by the side clamps of the two holders 10 in the configuration best illustrated in FIG. 13.

It was previously noted that in the arrangement shown in FIGS. 11–24, that the two holders 10 were each provided with an associated board end clamp assembly 80. One of these assemblies will now be described with reference to FIGS. 22–25.

Figure 22:
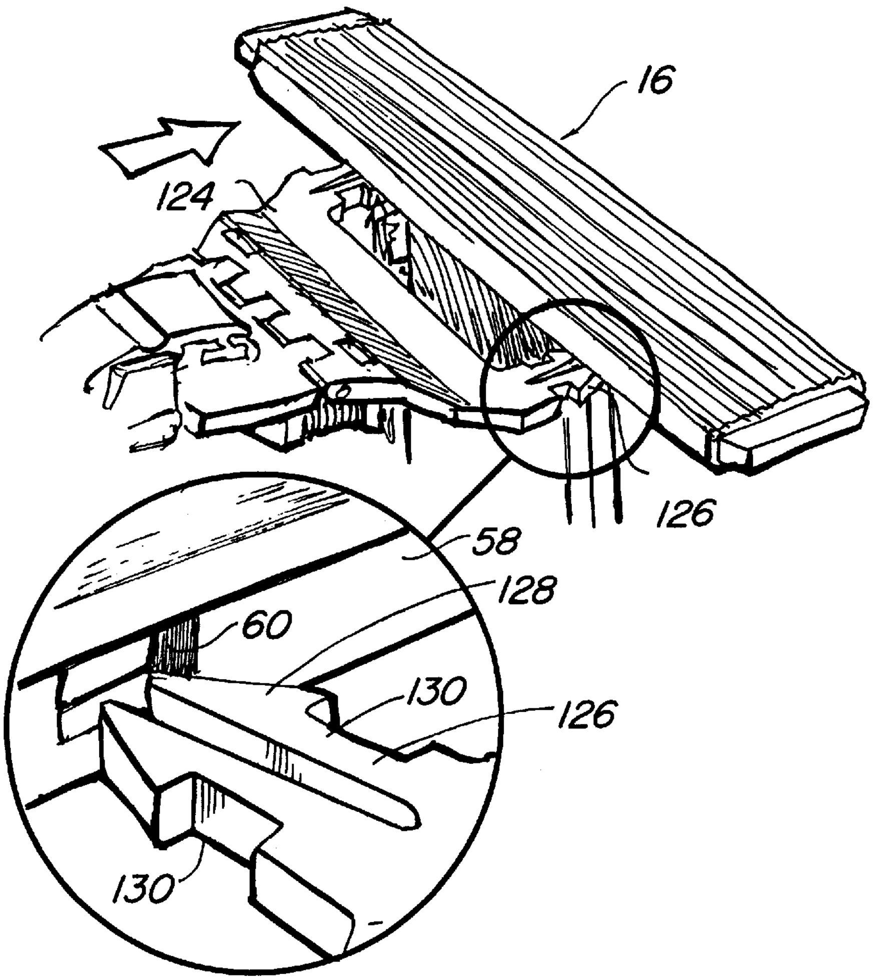
FIG. 22 is a perspective view showing how the board end clamp assembly is mounted to the T-member of the board end holder.

It was previously noted that the reinforcing flanges 58 of the support head were provided with a spaced part pair of rectangular apertures 60 (FIGS. 9 and 22). Each end clamp assembly 80 includes a clamp wing 124, the inner proximal end of same bearing spaced anchor tips 126 (as best seen in the enlargement associated with FIG. 22), each such anchor tip comprising a bifurcated spear head 128 sized to fit into the rectangular aperture 60 tightly so that the halves of the bifurcated spear head 128 are sprung toward each other during insertion through the aperture 60 with the opposed recesses 130 behind the spear head permitting the two halves to thereafter spring outwardly whereby these tip portions of the clamp wing 124 are firmly anchored in position.

Figure 23:
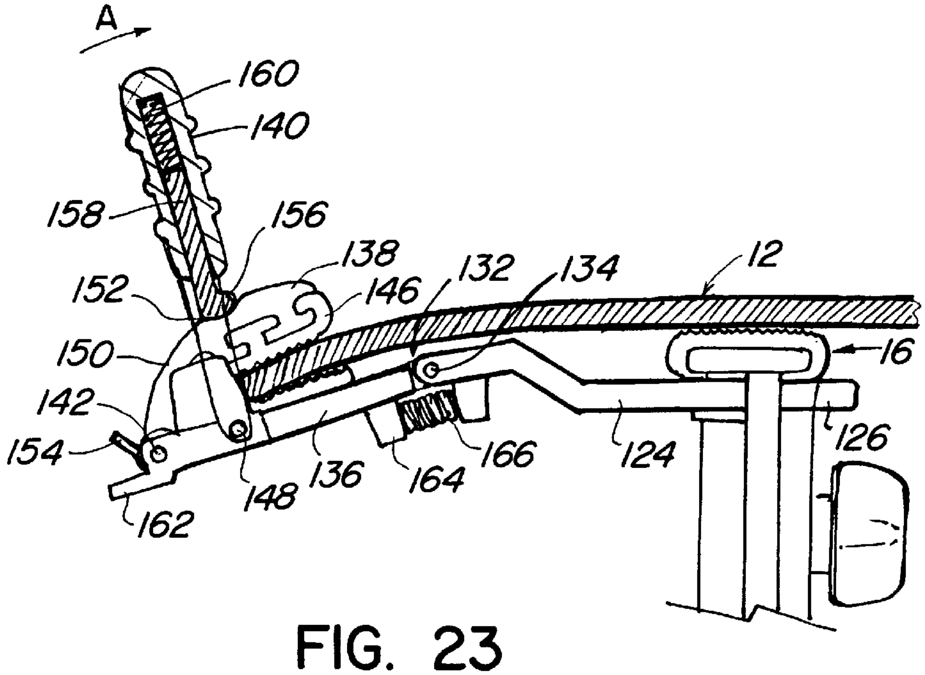
FIG. 23 is a side elevation view, partly in section, of the board end clamp assembly with the jaws thereof in clamping engagement with the tip of a snowboard.
Figure 24:
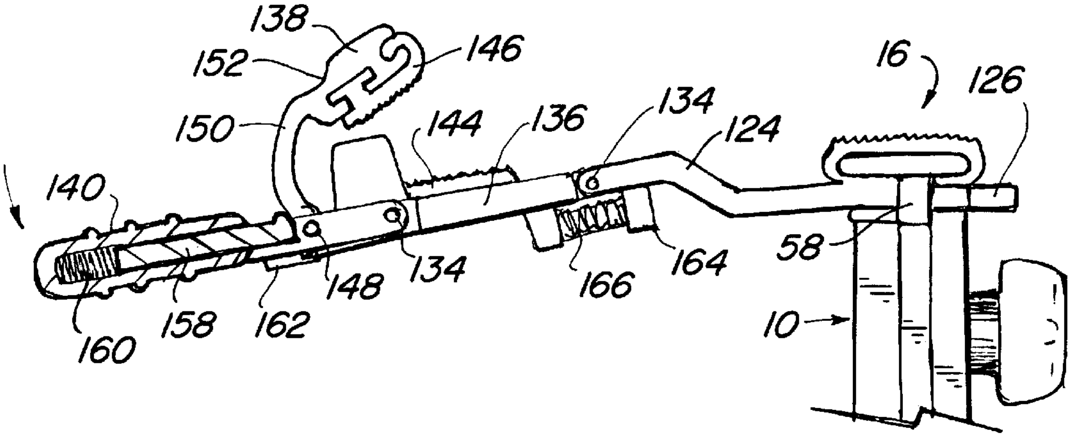
FIG. 24 is a side elevation view similar to that of FIG. 23 but with the clamp jaws shown separated or open.
Figure 25:
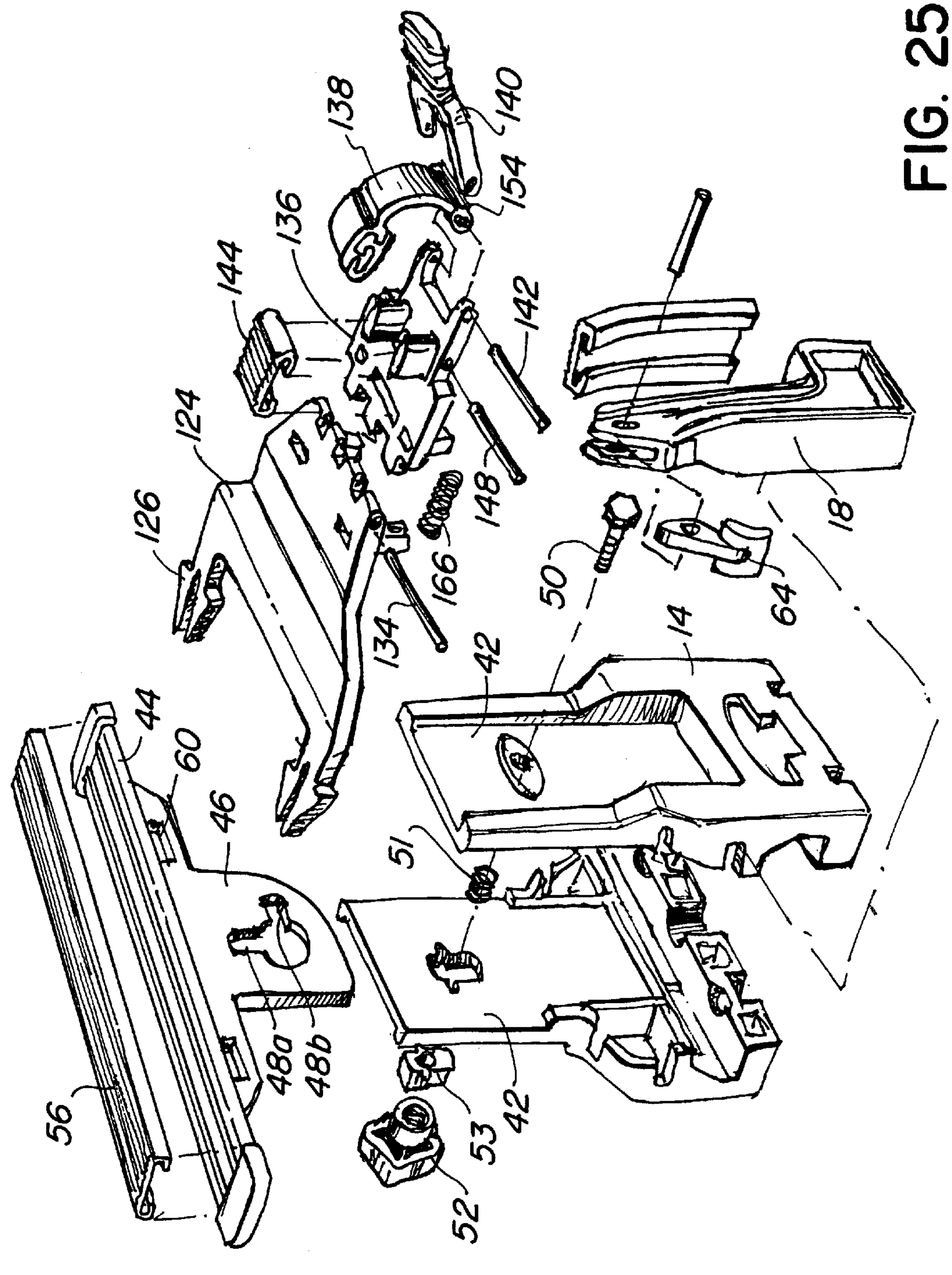
FIG. 25 is an exploded perspective view of the board end clamp assembly and associated components.

As best seen in FIGS. 23 and 24, the clamp wing 124 extends laterally outwardly away from the associated support head 16 of the holder 10. The distal end of this clamp wing is provided with a hinge connection 132 including a hinge pin 134 serving to mount to the distal end of the clamp wing a lower clamp jaw 136, an upper clamp jaw 138 an the upper clamp jaw actuator lever 140. The outer or distal extremity of the lower clamp jaw 136 is provided with a further hinge pin 142 which serves to pivotally mount the upper clamp jaw 138. Both the lower clamp jaw 136 and the upper clamp jaw 138 are provided with respective rubber jaw pads 144 and 146 which serve to grip the opposing snowboard end surfaces without causing damage thereto.

The upper clamp jaw actuator handle 140 is pivotally mounted to the lower clamp jaw 136 by way of a pivot axle 148 which is located generally intermediate the upper clamp jaw pivot axis 142 and the aforementioned hinge pin 134 which connects the entire lower clamp jaw 136 to the distal end of the clamp wing.

As best seen in FIGS. 23 and 24, the upper clamp jaw is provided with an arcuately curved clamp jaw arm 150. This curved clamp jaw arm 150 is provided with an outer shallow detent 152 positioned in an outboard position adjacent the upper clamp jaw pad 146. The inner or proximal end of the jaw arm has a short lip projecting outwardly in close proximity to the upper clamp jaw pivot pin 142. Both the detent 152 and lip 154 are adapted to cooperate with the arcuately curved end portion 156 of a pressure tongue 158 which is slidably mounted in the actuator handle 140. A coil compression spring 160 mounted within the actuator handle continually urges the pressure tongue 158 outwardly and into engagement with the arcuately curved surface of the clamp jaw arm 150 and, when appropriately positioned, into engagement with either detent 152 or lip 154 noted above.

With reference to FIG. 23, when the actuator handle 140 has been moved to the raised position as shown, the end of the pressure tongue 158 comes into engagement with the outer detent 152 thus exerting maximum pressure or force between the upper and lower clamping jaws 138, 136 (and the snowboard end portion engaged therebetween). As the actuator handle 140 is rotated in the opposite direction by the operator, this pressure tends to be reduced somewhat and as the actuator handle 140 is brought all the way downwardly toward and slightly beyond the position illustrated in FIG. 24, the pressure tongue 158 contacts lip 154 thus exerting a counterclockwise force which causes the upper clamp jaw 138 to open with a snap-action effect. In order to prevent over rotation of the actuator handle 140 in this counterclockwise direction there is provided a rearwardly extending tab 162 which is fixed to and forms a part of the lower clamp jaw 136 and onto which tab pressure may be applied by the fore finger of the operator when the actuator handle 140 is being rotated downwardly in the counterclockwise direction thereby to achieve the rapid snap action opening effect for the upper clamp jaw 138. The ease with which the board ends can be clamped and released by the above-described assembly will be apparent from the above.

It will be appreciated that the end clamp assembly 80 must be arranged to accommodate a fairly large range of board tip angles. In order to achieve this, and to provide the necessary resiliency and flexibility, the clamp wing 124 is pivotally connected to the upper and lower jaws via the hinge 132 and pin 134 referred to previously. However, this in itself is insufficient as it is desired that the upper and lower clamp jaws 138, 136 not be permitted to droop or hang downwardly and in order to prevent this, the clamp wing 124 and lower clamp jaw 136 are each provided with associated pairs of spring seating blocks 164 between each of which pairs extends a coil compression spring 166. These coil compression springs 166 keep the outer end of the entire end clamping assembly from drooping downwardly but yet provide sufficient resiliency so that when a snowboard is mounted as illustrated in FIG. 23, this resiliently biased hinge arrangement can be easily deflected sufficiently as to permit the tip of the snowboard to enter into a proper association between the upper and lower clamping jaws 138, 136 and to be firmly clamped therebetween.

The various ways in which the structures described above may be utilized will be readily apparent from the foregoing description and the accompanying drawings. Those skilled in this particular art will appreciate that the apparatus described above permits snowboard repair and maintenance work to be readily accomplished while, at the same time, a minimum amount of time and effort is required to mount and dismount the snowboard to and from the holding devices described above.

I claim:

1. A portable holder for use as a snowboard support during maintenance operations at a work station, said holder being adapted to support one of the opposing end portions of the snowboard, the portable holder comprising a base section adapted to be fixed to the work station in a generally upright position and a snowboard support head mounted to said base section to permit movement of said support head relative to said base section between a first position where said support head is generally horizontal to provide support for a snowboard end portion during snowboard base maintenance to a second position where said support head is generally vertical, said base section further having a side clamp thereon for releasably clamping a snowboard in a generally vertical orientation during snowboard edge maintenance when the support head is in the generally vertical second position, whereby said holder can be readily converted between snowboard base maintenance and snowboard edge maintenance operations.

2. The portable holder as in claim 1 wherein said support head is mounted to the base section for generally pivotal movement between said horizontal first position and said generally vertical second position and means for locking said support head in both said generally horizontal first position and said generally vertical second position.

3. The portable holder of claim 2 wherein said base section has a pair of opposing sides, said support head being mounted to said base section such that when said support head is in the generally vertical second position said support head is located outwardly of one said side of said base section with said side clamp being located adjacent the opposing side of said base section and in spaced relation to said support head.

4. The portable holder of claim 3 wherein said base section includes an upper portion defined by a pair of spaced flanges, said support head including a support tongue disposed between said flanges, said means for locking the support head including an aperture of selected shape in said tongue and a locking block carried in one of said flanges and capable of moving into said aperture only when said support head is located in one of said first and second positions.

5. The portable holder of claim 4 wherein said aperture has a pair of recesses therein generally at right angles to one another, said locking block being movable into and out of engagement with said tongue within one of said pair of recesses to lock said support head relative to said base section in one of the first or second positions, and hand-operated means for moving said locking block into and out of said engagement.

6. The portable holder as in claim 1 wherein said side clamp comprises a clamp leaf and a cam associated therewith to bias said clamp leaf against a snowboard located in said side clamp to fix the snowboard relative to said base section for edge maintenance thereof.

7. The portable holder as in claim 1 wherein said snowboard support head has a resilient surface thereon to frictionally engage the snowboard when resting thereon in the generally horizontal snowboard base maintenance first position.

8. The portable holder as in claim 1 where said holder includes an end clamp for gripping an end of the snowboard to secure same to said support head.

9. The portable holder as in claim 8 wherein said end clamp includes a pair of opposed, jaws one of which jaws is pivotally movable relative to the opposing jaw for gripping said snowboard end therebetween, and a clamp jaw actuator handle movable between opening and closing positions corresponding to the open and closed positions of said jaws.

10. The portable holder as in claim 9 wherein said actuator handle has a pressure spring means associated therewith for exerting force on said one pivotally movable jaw when said handle is in the closing position to permit said jaws to resiliently engage and grip a variety of snowboard end thicknesses.

11. The portable holder as in claim 10 wherein said end clamp includes a wing assembly secured to said support head to support said end clamp outboard of the base section, said wing assembly being flexible to accommodate a variety of snowboard tip angles.

12. The portable holder of claim 10 wherein said pivotally movable jaw has a detent therein within which said pressure spring means engages when said actuator handle is in the closing position thereby to provide a stable closing position for said movable jaw.

13. The portable holder of claim 12 wherein said pivotally movable jaw has means thereon adapted to come into engagement with said pressure spring means when said actuator handle is moved into the open position in such manner as to cause the movable jaw to pivot into the open position.

14. The portable holder of claim 1 in combination with a further said portable holder to support both of the opposing end portions of the snowboard, a center support adapted to be attached to the work station intermediate and spaced from both of said portable holders to provide additional support to the center of the snowboard during base maintenance, said center support having a snowboard contacting center support head and means for adjusting the height of said center support head relative to the work station.

15. The portable holder of claim 14 wherein said center support includes a center support base to which said board contacting center support head is mounted, said center support base having an upper section and a lower section, said upper section being releasable from a first location wherein said lower section and said upper section are rigidly fixed relative to one another and movable to a second location wherein said upper section can be rotated about an upright axis and then rotated about a generally horizontal axis outwardly and downwardly relative to said lower section to provide clearance when in use to permit the snowboard to be moved into the vertical orientation and secured in the side clamps of each of the portable holders for edge maintenance purposes.

16. The portable holder of claim 15 where said center support head is mounted for movement upwardly and downwardly relative to the support base to provide the adjustment in height, a spring arranged to co-act between said support base and said center support head to bias the center support head outwardly, and means to secure the center support head at the desired adjusted height.

17. A center support for use in the maintenance of snowboards and adapted to be attached to a work station intermediate a spaced pair of snowboard end holders to provide additional support to the center of the snowboard during snowboard base maintenance, said center support comprising a board contacting center support head and a center support base to which said board contacting center support head is mounted, said center support base having an upper section and a lower section both constructed and arranged such that said upper section is liftable upwardly relative to said lower section to effect release from a first configuration wherein said lower section and said upper sections are rigidly fixed relative to one another and movable into a second configuration wherein said upper section can be rotated about an upright axis and thereafter rotated about a generally horizontal axis relative to said lower section to thereby enable said upper section to be swung outwardly and downwardly to provide clearance when in use to permit a snowboard to be moved into a vertical orientation and otherwise secured for edge maintenance purposes.

18. The center support of claim 17 wherein said upper and lower base sections are provided with recess and boss means respectively which interfit closely with one another in the first configuration to rigidly fix said upper and lower sections relative to one another while permitting said upper section to be manually pulled upwardly clear of said lower section into said second configuration.

19. The center support of claim 18 including means limiting the upward movement of said upper section relative to said lower section, said limiting means also serving to define mutually transverse axes of rotation to enable the rotation of said upper section about said upright axis and said horizontal axis relative to said lower section.

20. The center support of claim 17 where said center support head is mounted to a support tongue which extends into a recess in said upper section for movement therein upwardly or downwardly to provide an adjustment in height relative to the work station, a spring mounted within said recess in said upper section and bearing against said support tongue to bias the center support head upwardly relative to said upper section, and means co-operating with said support tongue to secure the center support head in the desired adjusted position.

21. A portable holder for use as a snowboard support during maintenance operations at a work station, said holder being adapted to support one of the opposing end portions of the snowboard, the portable holder comprising a base section adapted to be fixed to the work station in a generally upright position and a snowboard support head mounted to said base section to permit movement of said support head relative to said base section between a first position where said support head is generally horizontal to provide support for a snowboard end portion during snowboard base maintenance to a second position where said support head is generally vertical, said holder including an end clamp mounted to said support head for movement therewith for gripping an end of the snowboard to secure same to said support head to permit the snowboard to be held securely during snowboard maintenance operations and to permit said holder to be readily converted between snowboard base maintenance and snowboard edge maintenance operations.

22. The portable holder as in claim 21 wherein said support head is mounted to the base section for generally pivotal movement between said horizontal first position and said generally vertical second position and means for locking said support head in both said generally horizontal first position and said generally vertical second position.

23. The portable holder as in claim 21 wherein said end clamp includes a pair of opposed jaws, one of which jaws is pivotally movable relative to the opposing jaw for gripping said snowboard end therebetween, and a clamp jaw actuator handle movable between opening and closing positions corresponding to the open and closed positions of said jaws.

24. The portable holder as in claim 23 wherein said actuator handle has a pressure spring means associated therewith for exerting force on said one pivotally movable jaw when said handle is in the closing position to permit said jaws to resiliently engage and grip a variety of snowboard end thicknesses.

25. The portable holder as in claim 24 wherein said end clamp includes a wing assembly secured to said support head to support said end clamp outboard of the base section, said wing assembly being flexible to accommodate a variety of snowboard tip angles.

26. The portable holder of claim 24 wherein said pivotally movable jaw has a detent therein within which said pressure spring means engages when said actuator handle is in the closing position thereby to provide a stable closing position for said movable jaw.

27. The portable holder of claim 26 wherein said pivotally movable jaw has means thereon adapted to come into engagement with said pressure spring means when said actuator handle is moved into the open position in such manner as to cause the movable jaw to pivot into the open position.

28. The portable holder of claim 21 wherein said base section has a side clamp thereon for releasably clamping a second snowboard in a generally vertical orientation when said support head is in the generally vertical second position whereby to permit both the first and second mentioned snowboards to be held in the generally vertical orientation for edge maintenance operations.

29. The portable holder as in claim 28 wherein said side clamp comprises a clamp leaf and a cam associated therewith to bias said clamp leaf against the snowboard located in said side clamp to fix that snowboard relative to said base section for edge maintenance thereof.

30. A portable holder for use as a snowboard support during maintenance operations at a work station, said holder being adapted to support one of the opposing end portions of the snowboard, the portable holder comprising a base section adapted to be fixed to the work station in a generally upright position and a snowboard support head mounted to said base section to permit movement of said support head relative to said base section between a first position where said support head is generally horizontal to provide support for a snowboard end portion during snowboard base maintenance to a second position where said support head is generally vertical wherein said base section has a pair of opposing sides, said support head being mounted to said base section such that when said support head is in the generally vertical second position, said support head is located outwardly of one said side of said base section, said support head being mounted to the base section for generally pivotal movement between said horizontal first position and said generally vertical second position and means for locking said support head in either said generally horizontal first position or said generally vertical second position.

31. The portable holder of claim 30 wherein said base section includes an upper portion defined by a pair of spaced flanges, said support head including a support tongue disposed between said flanges, said means for locking the support head including an aperture of selected shape in said tongue and a locking block carried in one of said flanges and capable of moving fully into said aperture only when said support head is located in one of said first and second positions.

32. The portable holder of claim 31 wherein said aperture has a pair of recesses therein generally at right angles to one another, said locking block being movable such that portions of said block are brought into and out of engagement with said tongue within one or other of said pair of recesses to lock said support head relative to said base section in either one of the first or second positions, and hand-operated means for moving said locking block into and out of said engagement.

* * * * *